(12) United States Patent
Handa (10) Patent No.: US 8,219,296 B1
(45) Date of Patent: Jul. 10, 2012

(54) CONTROL DEVICE FOR CONTROLLING DRIVE FORCE THAT OPERATES ON VEHICLE

(75) Inventor: Toshiyuki Handa, East Liberty, OH (US)

(73) Assignee: Nissin Kogyo Co., Ltd., Ueda-shi, Nagano (JP)

( * ) Notice: Subject to any disclaimer, the term of this patent is extended or adjusted under 35 U.S.C. 154(b) by 0 days.

(21) Appl. No.: 13/075,868

(22) Filed: Mar. 30, 2011

(51) Int. Cl.
*B60K 17/34* (2006.01)
(52) U.S. Cl. .......................................... 701/69; 180/197
(58) Field of Classification Search ....................... 701/69
See application file for complete search history.

(56) References Cited

U.S. PATENT DOCUMENTS

| | | | | | |
|---|---|---|---|---|---|
| 4,849,891 | A | * | 7/1989 | Krohn et al. ..................... | 701/89 |
| 4,966,249 | A | * | 10/1990 | Imaseki ......................... | 180/233 |
| 5,137,105 | A | * | 8/1992 | Suzuki et al. ................. | 180/197 |
| 5,251,719 | A | * | 10/1993 | Eto et al. ....................... | 180/197 |
| 5,253,728 | A | * | 10/1993 | Matsuno et al. .............. | 180/446 |
| 5,259,476 | A | * | 11/1993 | Matsuno et al. .............. | 180/197 |
| 5,332,059 | A | * | 7/1994 | Shirakawa et al. ........... | 180/197 |
| 5,471,390 | A | * | 11/1995 | Sasaki ............................ | 701/78 |
| 5,599,075 | A | * | 2/1997 | Hara et al. ..................... | 303/143 |
| 5,631,829 | A | * | 5/1997 | Takasaki et al. ............... | 701/69 |
| 5,701,247 | A | * | 12/1997 | Sasaki ............................. | 701/1 |
| 6,094,614 | A | * | 7/2000 | Hiwatashi ....................... | 701/89 |
| 6,131,054 | A | * | 10/2000 | Shibahata ........................ | 701/1 |
| 6,604,035 | B1 | * | 8/2003 | Wetzel et al. ................... | 701/38 |
| 6,640,178 | B2 | * | 10/2003 | Wakamatsu et al. ........... | 701/51 |
| 2006/0015236 | A1 | * | 1/2006 | Yamaguchi et al. ........... | 701/69 |
| 2006/0212173 | A1 | | 9/2006 | Post, II | |

FOREIGN PATENT DOCUMENTS

| | | | | |
|---|---|---|---|---|
| GB | 2280157 A | * | 1/1995 | |
| JP | 01095939 A | * | 4/1989 | |

* cited by examiner

*Primary Examiner* — Shelley Chen
(74) *Attorney, Agent, or Firm* — Rankin, Hill & Clark LLP (57) ABSTRACT

A control device for controlling a front wheel drive force and a rear wheel drive force of a vehicle comprises a first controller for controlling a drive force of main drive wheels and the drive force of auxiliary drive wheels; and a second controller for sending to the first controller an auxiliary-drive-wheels-limiting drive force for limiting the drive force of the auxiliary drive wheels in a case that the vehicle is traveling in an unstable state. The second controller has a first calculation unit for calculating a first limiting drive force on the basis of lateral acceleration of the vehicle, and a second calculation unit for calculating a second limiting drive force on the basis of longitudinal acceleration of the vehicle. The second controller sends to the first controller a maximum limiting drive force among the first limiting drive force and the second limiting drive force as the auxiliary-drive-wheel-limiting drive force.

12 Claims, 8 Drawing Sheets

CONTROL DEVICE FOR CONTROLLING DRIVE FORCE THAT OPERATES ON VEHICLE

FIELD OF THE INVENTION

The present invention relates to a control device (drive force control device) for controlling front wheel drive force and rear wheel drive force of a vehicle.

BACKGROUND OF THE INVENTION

Vehicles, e.g., automobiles, generally have four wheels; i.e., two front wheels and two rear wheels, and can have an electronic control device for driving the wheels.

Japanese Laid-open Patent Application (JP-A) No. 2006-256605 discloses a four-wheel-drive electronic control unit (4WD-ECU) as such an electronic control device. The 4WD-ECU disclosed in JP 2006-256605 A together with a vehicle stability assist (VSA)-ECU controls the drive force that operates on the vehicle; and, specifically, sets the four-wheel-drive force in terms of units of, e.g., torque.

A 4WD-ECU thus operates in coordination with the VSA-ECU and controls the drive force. Specifically, the VSA-ECU can request the 4WD-ECU to limit the drive force in the case that, e.g., the vehicle is traveling in an unstable state. The 4WD-ECU can reduce the drive force and improve vehicle stability in response to a request from the VSA-ECU.

A VSA-ECU or other vehicle behavior control means can generally be provided with at least one function from among a function for suppressing spinning of the wheels (traction control system), a function for suppressing locking of the wheels (antilock brake system), and a function for suppressing lateral sliding of a vehicle.

SUMMARY OF THE INVENTION

An object of the present invention is to provide a control device that can improve the stability of a vehicle.

Other objects of the present invention will be apparent to those skilled in the art in the description of a plurality of modes and preferred embodiments below with reference to that attached diagrams.

A number of aspects from among the plurality of aspects pursuant to the present invention will be described below in order to facilitate understanding of the general overview of the present invention.

According to the present invention, there is provided a control device for controlling a front wheel drive force and a rear wheel drive force of a vehicle, the control device comprising: first control means for controlling a drive force of a main drive wheel and a drive force of an auxiliary drive wheel, the drive force of the main drive wheel being one of the front-wheel drive force and the rear-wheel drive force, and the drive force of the auxiliary drive wheel being another of the front-wheel drive force and the rear-wheel drive force; and second control means for sending to the first control means an auxiliary-drive-wheel-limiting drive force for limiting the drive force of the auxiliary drive wheel in a case that the vehicle is traveling in an unstable state, wherein the second control means has: a first calculation unit for calculating a first limiting drive force on the basis of lateral acceleration of the vehicle; a second calculation unit for calculating a second limiting drive force on the basis of longitudinal acceleration of the vehicle, and wherein the second control means sends to the first control means a maximum limiting drive force among the first limiting drive force and the second limiting drive force as the auxiliary-drive-wheel-limiting drive force.

The amount of reduction in the drive force of an auxiliary drive wheel is reduced and vehicle stability can thereby be improved. In other words, the amount of reduction in the drive force of an auxiliary drive wheel can be increased when the auxiliary-drive-wheel-limiting drive force is calculated without consideration for lateral acceleration and longitudinal acceleration. In the control device, the maximum limiting drive force is the first limiting drive force in the case that the first limiting drive force based on the lateral acceleration is greater than the second drive force. Alternatively, the maximum limiting drive force is the second limiting drive force in the case that the first limiting drive force is equal to or less than the second drive force. The second control means sends to the first control means such a maximum limiting drive force as the auxiliary-drive-wheels-limiting drive force.

In one form of the present invention, the first control means increases the drive force of the main drive wheel by causing the drive force of the auxiliary drive wheel to match the auxiliary-drive-wheel-limiting drive force.

Since the drive force of the auxiliary drive wheels is made to match the auxiliary-drive-wheels-limiting drive force, the drive force of the auxiliary drive wheels can be reduced and the drive force of the main drive wheels can be increased. In the case that the vehicle is traveling in a state of, e.g., oversteer, and is therefore unstable, the ratio of the drive force of the main drive wheels to the drive force of the auxiliary drive wheels can be modified to suppress or eliminate oversteer.

The first limiting drive force may be greater in proportion to a greater magnitude of the lateral acceleration.

The first limiting drive force is set to be greater in proportion to a greater magnitude of the lateral acceleration. The amount of reduction in the drive force of an auxiliary drive wheel is therefore smaller in proportion to a greater magnitude of the lateral acceleration, and vehicle stability can be improved.

Similarly, the second limiting drive force may be greater in proportion to a greater magnitude of the longitudinal acceleration.

The second limiting drive force is set to be greater in proportion to a greater magnitude of the longitudinal acceleration. The amount of reduction in the drive force of an auxiliary drive wheel is therefore smaller in proportion to a greater magnitude of the longitudinal acceleration, and vehicle stability can be improved.

Preferably, the control device may be configured so that the second control means further has a third calculation unit for calculating a third limiting drive force on the basis of a speed of the vehicle; and the second control means sends to the first control means a maximum limiting drive force among the first limiting drive force, the second limiting drive force, and the third limiting drive force as the auxiliary-drive-wheel-limiting drive force.

The stability of the vehicle can be improved by calculating the maximum limiting drive force (auxiliary-drive-wheel-limiting drive force) with consideration given to the lateral acceleration, the longitudinal acceleration, and the speed.

The third limiting drive force may be smaller in proportion to a greater magnitude of the speed.

The third limiting drive force is set to be smaller in proportion to a greater magnitude of the speed. The amount of reduction in the drive force of an auxiliary drive wheel is therefore greater in proportion to a greater magnitude of the speed. Vehicle instability can generally be effectively suppressed or reduced as the amount of reduction in the drive force of an auxiliary drive wheel is greater, hence, as the drive force of an auxiliary drive wheel is smaller. Nevertheless, the third limiting drive force can be used as long as the third limiting drive force is greater than the first limiting drive force or the second limiting drive force. In the case that the third limiting drive force is less than the first limiting drive force or the second limiting drive force, the first limiting drive force or the second limiting drive force that is greater than the third limiting drive force is used, and vehicle stability is improved.

Preferably, the third calculation unit calculates the third limiting drive force on the basis of a drive force of all the wheels of the vehicle, a drive force distribution of an auxiliary drive wheel of the vehicle, and the vehicle speed.

The third calculation unit is capable of calculating a more suitable third limiting drive force with consideration given to the drive force of all the wheels, the drive force distribution of an auxiliary drive wheel, and the speed.

The drive force distribution of the auxiliary drive wheel may be smaller in proportion to a greater magnitude of the speed.

The drive force distribution of an auxiliary drive wheel is set to be smaller in proportion to a greater magnitude of the speed. The third limiting drive force can therefore be set to be smaller in proportion to a greater magnitude of the speed. An effective third limiting drive force can thus be prepared.

The second control means may further have a correction unit for correcting the lateral acceleration to obtain a corrected lateral acceleration, wherein the first calculation unit calculates the first limiting drive force on the basis of the corrected lateral acceleration; and in a case that an absolute value of a current lateral acceleration is reduced from an absolute value of a previous lateral acceleration by an amount equal to a first value, the correction unit calculates a value reduced from a previous corrected lateral acceleration by an amount equal to a second value as a current corrected lateral acceleration, it being possible for the second value to be less than the first value.

In the case that the lateral acceleration is reduced, the correction unit can obtain a corrected lateral acceleration so as to suppress a reduction in the lateral acceleration. Therefore, a reduction in the first limiting drive force can be suppressed even in the case that the lateral acceleration is reduced.

Furthermore, the second control means may further have a correction unit for correcting the longitudinal acceleration to obtain a corrected longitudinal acceleration, wherein the second calculation unit calculates a second limiting drive force on the basis of the corrected longitudinal acceleration; and in a case that a maximum value of a current longitudinal acceleration and zero is reduced from a maximum value of a previous longitudinal acceleration and zero by an amount equal to a first value, the correction unit calculates a value reduced from a previous corrected longitudinal acceleration by an amount equal to a second value as a current corrected longitudinal acceleration, the second value being less than the first value.

In the case that the longitudinal acceleration is reduced, the correction unit can obtain a corrected longitudinal acceleration so as to suppress a reduction in the longitudinal acceleration. Therefore, a reduction in the second limiting drive force can be suppressed even in the case that the longitudinal acceleration is reduced.

According to the invention, the drive force of the main drive wheel may be the front-wheel drive force, and the drive force of the auxiliary drive wheel may be the rear-wheel drive force.

In the case that the vehicle is traveling in a state of, e.g., oversteer and is therefore unstable, the rear-wheel drive force (auxiliary drive wheel drive force) is reduced, the front-wheel drive force (main drive wheel drive force) is increased, and oversteer can be reduced or eliminated.

According to the invention, the first control means may be a drive force control means, and the second control means may be a vehicle behavior control means.

Persons skilled in the art can readily understand that each of a plurality of embodiments in accordance with the present invention can be modified without departing from the spirit of the present invention.

BRIEF DESCRIPTION OF THE DRAWINGS

Certain preferred embodiments of the present invention will be described in detail below, by way of example only, with reference to the accompanying drawings, in which.

DETAILED DESCRIPTION OF THE PREFERRED EMBODIMENTS

The embodiments described below are used for facilitating understanding of the present invention. Therefore, persons skilled in the art should note that that the present invention is not unduly limited by the embodiments described below.

1. Vehicle

Figure 1:
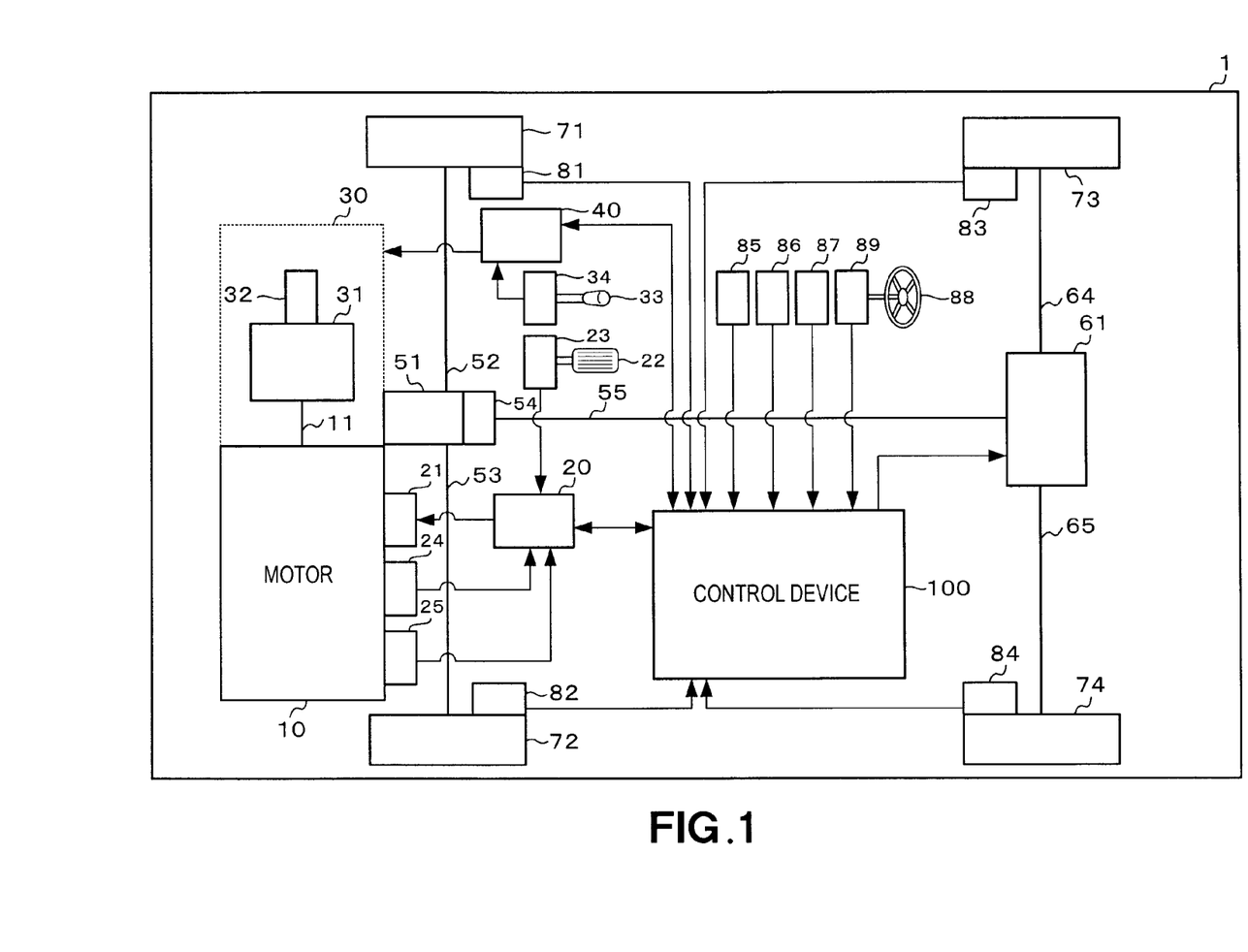
FIG. 1 a diagrammatical view showing a general configuration of a vehicle provided with a control device according to the present invention.

FIG. 1 shows a schematic structural diagram of a vehicle provided with the control device according to the present invention. A vehicle 1 (e.g., an automobile) is provided with a control device 100 capable of executing various controls, as shown in FIG. 1. The control device 100 is capable of controlling the front wheel drive force (the target value of the drive force transmitted to front wheels 71, 72) and the rear wheel drive force (the target value of the drive force transmitted to rear wheels 73, 74) of the vehicle 1 as examples of the various controls. Specific control of the control device 100 according to the present invention is described below in "2. Control Device."

In the example of FIG. 1, the vehicle 1 is provided with a motor 10 (e.g., gasoline engine or another internal combustion engine), the motor 10 has an output shaft 11, and the motor 10 can cause the output shaft 11 to rotate. The vehicle 1 is provided with motor control means 20 (e.g., an engine ECU) for controlling the motor 10, and a throttle actuator 21. The motor control means 20 obtains the motor drive force (target value), and the motor control means 20 controls the throttle actuator 21 so that the rotation (the actual motor drive force) of the output shaft of the motor 10 matches the motor drive force (target value).

The throttle (not shown) position for controlling the amount of air-fuel mixture flowing into the motor 10 is controlled based on the motor drive force via the throttle actuator 21. In other words, the motor control means 20 obtains the throttle position that corresponds to the motor drive force, generates a control signal that corresponds to the throttle position, and sends the control signal to the throttle actuator 21. The throttle actuator 21 adjusts the throttle position in accordance with the control signal from the motor control means 20.

The vehicle 1 is provided with an accelerator pedal 22 and an accelerator sensor 23. The accelerator sensor 23 detects the amount of operation of the accelerator pedal 22 by the driver of the vehicle 1 and sends the amount of operation of the accelerator pedal 22 to the motor control means 20. The motor control means 20 generally obtains the throttle position or the motor drive force on the basis of the amount of operation of the accelerator pedal 22. The vehicle 1 is provided with an engine speed sensor 24 and a pressure sensor 25. In the case that the motor 10 is, e.g., an engine, the engine speed sensor 24 can detect the engine speed, and the pressure sensor 25 can detect the absolute pressure inside the intake tube that takes the air-fuel mixture into the engine. The motor control means 20 can obtain the throttle position or the motor drive force on the basis of the amount of operation of the accelerator pedal 22, and the detected absolute pressure and engine speed. The motor control means 20 can modify the amount of operation of the accelerator pedal 22 on the basis of a control signal (e.g., the traveling state of the vehicle 1) from the control device 100. Alternatively, the motor control means 20 may obtain the motor drive force and the throttle position on the basis of the amount of operation of the accelerator pedal 22, the detected engine speed, the detected absolute pressure, and a control signal from the control device 100.

In the example of FIG. 1, the vehicle 1 may be provided with a power transmission apparatus (power train, drive train). The power transmission apparatus has, e.g., a transmission 30, a front differential gear mechanism 51, front drive shafts 52, 53, a transfer 54, a propeller shaft 55, a rear differential gear mechanism 61, rear drive shafts 64, 65, as shown in FIG. 1. The transmission 30 has a torque converter 31 and gear mechanism 32.

The power transmission apparatus is not limited to the example of FIG. 1, and it is also possible to modify, revise, or implement the example of FIG. 1. The power transmission apparatus may be, e.g., the drive force transmission system 3 disclosed in FIG. 2 of Japanese Laid-open Patent Application (JP-A) No. 07-186758.

The rotation (the actual motor drive force) of the output shaft of the motor 10 is converted to actual all-wheel drive force (the actual front-wheel drive force and the rear-wheel drive force) via the power transmission apparatus. In the control related to such conversion, the all-wheel drive force (target value) is determined based on the motor drive force (target value) of the motor control means 20, the amplification factor (target value) of the torque converter 31, and the speed-change gear ratio (target value) of the gear mechanism 32. The distribution from the front-wheel drive force (target value), which is the drive force of the main drive wheel, to the rear-wheel drive force (target value), which is the drive force of the auxiliary drive wheel, is determined based on the front-wheel drive force (target value) and the distribution ratio of the rear differential gear mechanism 61.

In the case that the distribution ratio of the rear differential gear mechanism 61 is, e.g., 100:0 in terms of the front-wheel drive force to rear-wheel drive force, the front-wheel drive force (target value), which is the drive force of the main drive wheel, matches the all-wheel drive force (target value). In the case that the distribution ratio of the rear differential gear mechanism 61 is, e.g., (100−x):x in terms of the front-wheel drive force to rear-wheel drive force, the front-wheel drive force (target value), which is the drive force of the main drive wheel, matches the value obtained by subtracting the rear-wheel drive force (target value), which is the drive force of the auxiliary drive wheel, from the all-wheel drive force (target value).

The front wheels 71, 72 are controlled by the front-wheel drive force (target value) via the front differential gear mechanism 51 and the front drive shafts 52, 53. The rear wheels 73, 74 are controlled by the rear-wheel drive force (target value) via the rear differential gear mechanism 61 and the rear drive shafts 64, 65. The actual all-wheel drive force is transmitted to the propeller shaft 55 via the transfer 54, and a portion of the actual all-wheel drive force transmitted to the propeller shaft 55 is distributed to the actual rear-wheel drive force transmitted to the rear differential gear mechanism 61. The remaining portion of the actual all-wheel drive force transmitted to the propeller shaft 55, transfer 54, and front differential gear mechanism 51 is the actual front-wheel drive force.

In the example of FIG. 1, the vehicle 1 is provided with transmission control means 40 (e.g., an automatic transmission (AT) ECU) for controlling the speed-change ratio (e.g., the speed-change gear ratio of the gear mechanism 32) of the transmission 30. The vehicle 1 is provided with a shift lever 33 and a shift position sensor 34, and the transmission control means 40 generally determines the speed-change gear ratio of the gear mechanism 32 on the basis of the shift position (e.g., "1," "2," "D") of the shift lever 33 as detected by the shift position sensor 34.

In the case that the shift position of the shift lever 33 is, e.g., "1," the transmission control means 40 controls the gear mechanism 32 so that the gear mechanism 32 has a speed-change gear ratio that represents the first speed. In the case that the shift position of the shift lever 33 is, e.g., "D," the transmission control means 40 determines the speed-change gear ratio that represents any one among all of the speed-change gears constituting the gear mechanism 32 composed of, e.g., first speed to fifth speed, on the basis of a control signal (e.g., the speed of the vehicle 1 and the all-wheel drive force (target value)) from the control device 100. In accordance therewith, the transmission control means 40 controls the gear mechanism 32 so that the gear mechanism 32 has a speed-change gear ratio that represents any one of, e.g., the first to fifth speeds. For example, when the transmission control means 40 thereafter changes from, e.g., the speed-change gear ratio that represents the first speed to the speed-change gear ratio that represents the second speed, the transmission control means 40 controls the gear mechanism 32 so that the gear mechanism 32 changes from the speed-change gear ratio that represents the first speed to the speed-change gear ratio that represents the second speed.

In the example of FIG. 1, the vehicle 1 is provided with a wheel speed sensor 81 for detecting the rotational speed of the front wheel 71, and is also provided with a wheel speed sensor 82 for detecting the rotational speed of the front wheel 72. The vehicle 1 is provided with a wheel speed sensor 83 for detecting the rotational speed of the rear wheel 73, and is also provided with a wheel speed sensor 84 for detecting the rotational speed of the rear wheel 74. The control device 100 can obtain the speed of the vehicle 1 on the basis of the rotational speed (wheel speed) detected by the wheel speed sensors 81, 82, 83, 84. The vehicle 1 is provided with a longitudinal acceleration sensor 85 (e.g., longitudinal G sensor for detecting acceleration in units of gravitational acceleration) for detecting the acceleration of the vehicle 1 along the front-rear or longitudinal direction of the vehicle 1, and the control device 100 can correct the speed of the vehicle 1 using the acceleration.

In the example of FIG. 1, the vehicle 1 is provided with a yaw rate sensor 86 for detecting the yaw rate when the vehicle 1 turns. The vehicle 1 is also provided with a lateral acceleration sensor 87 (lateral G sensor for detecting the centrifugal acceleration in units of gravitational acceleration) for detecting the centrifugal force (centrifugal acceleration) of the vehicle 1 along the lateral direction of the vehicle 1. The vehicle 1 is provided with a steering wheel 88 and a steering angle sensor 89, and the steering angle sensor 89 detects the steering angle of the steering wheel 88.

The control device 100 can detect side slipping and other behavior of the vehicle 1 on the basis of the yaw rate, centrifugal acceleration (lateral acceleration), and steering angle. In addition to detecting such behavior, the control device 100 can carry out various controls (e.g., control related to at least one among the front wheels 71, 72 and the rear wheels 73, 74 via the brakes or other braking unit (not shown)), and all of the controls described above are not required to be carried out. Described below is a general overview of control of the control device 100.

2. Control Device

Figure 2:
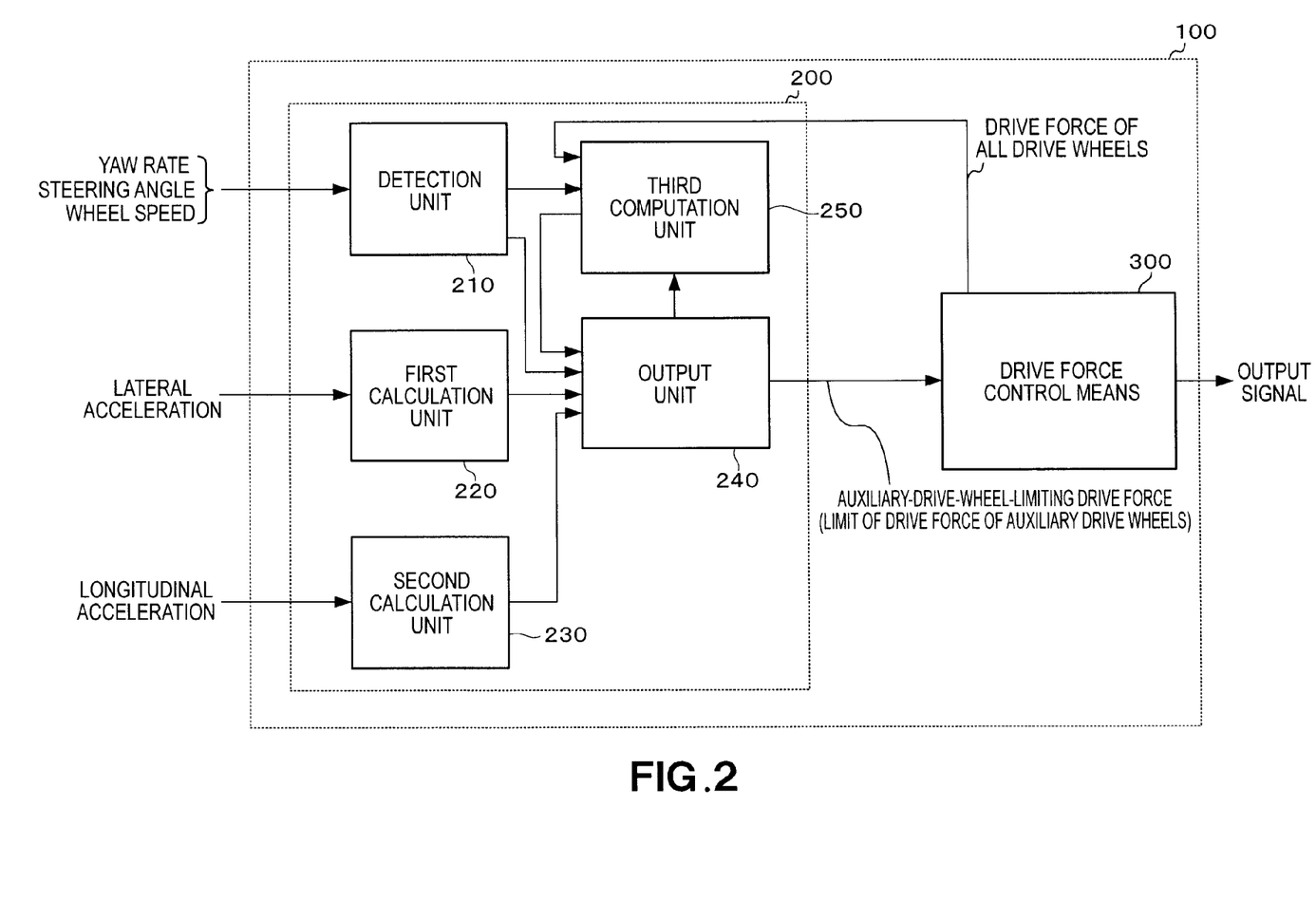
FIG. 2 is a block diagram showing a general configuration of the control device according to the present invention.

FIG. 2 shows a schematic structural diagram of the control device according to the present invention. The control device 100 can accept, e.g., the yaw rate, the steer angle, the wheel speed, the lateral acceleration, and the longitudinal acceleration as input signals; can generate output signals; and can execute various controls, as shown in FIG. 2. The control device 100 is provided with drive force control means 300 (drive force control means), and the drive force control means 300 controls the drive force of the main drive wheels (e.g., the front wheel drive force) and the drive force of the auxiliary drive wheels (e.g., rear wheel drive force), as an example of the various controls.

In the example of FIG. 2, the control device 100 is provided with vehicle behavior control means 200 (vehicle behavior control means). The vehicle behavior control means 200 is capable of sending to the drive force control means 300 the auxiliary-drive-wheels-limiting drive force (limiting drive force) for limiting the drive force of the auxiliary drive wheels as an example of various controls. Specifically, the vehicle behavior control means 200 is capable of sending to the drive force control means 300 the maximum limiting drive force of the first limiting drive force and the second limiting drive force as the auxiliary-drive-wheel-limiting drive force.

Specifically, the drive force control means 300 determines the ratio between the drive force of the main drive wheel (target value) and the drive force of the auxiliary drive wheel (target value), for example, and determines, e.g., the drive force of the auxiliary drive wheel (target value) on the basis of the ratio and the all-wheel drive force (target value). The drive force control means 300 controls, e.g., the distribution ratio of the rear differential gear mechanism 61 of FIG. 1 using output signals so that the determined auxiliary drive wheel drive force (target value) is obtained. The output signal from the drive force control means 300 to the rear differential gear mechanism 61 is a control signal for controlling the drive force of the auxiliary drive wheel (target value).

When the drive force of the auxiliary drive wheel is zero due to the distribution ratio of the rear differential gear mechanism 61, in other words, when the propeller shaft 55 and the rear drive shafts 64, 65 are cut off from each other, the drive force of the main drive wheel (target value) or the front-wheel drive force matches the all-wheel drive force (target value) in the example of FIG. 1. Alternatively, when the drive force of the auxiliary drive wheel is not zero due to the distribution ratio of the rear differential gear mechanism 61, in other words, when the propeller shaft 55 and the rear drive shafts 64, 65 are connected, the drive force of the main drive wheel (target value) matches the value obtained by subtracting the drive force of the auxiliary drive wheel (target value) from the all-wheel drive force (target value) in the example of FIG. 1.

In the example of FIG. 2, the control device 100 is provided with vehicle behavior control means 200. The vehicle behavior control means 200 is capable of accepting input signals that express the lateral acceleration (centrifugal acceleration) acquired from the lateral acceleration sensor 87 of FIG. 1, for example, the longitudinal acceleration (acceleration of the vehicle 1) acquired from the longitudinal acceleration sensor 85, as well as other signals. The first limiting drive force is based on, e.g., the lateral acceleration, and the second limiting drive force is based on, e.g., the longitudinal acceleration.

In the case that the vehicle behavior control means 200 sends a request for auxiliary-drive-wheels-limiting drive force (limiting drive force) to the drive force control means 300, the drive force control means 300 reduces the drive force of the auxiliary drive wheel (target value) and the drive force control means 300 increases the drive force of the main drive wheel (target value). At this time, the drive force control means 300 matches the drive force of the auxiliary drive wheel (target value) to the auxiliary-drive-wheels-limiting drive force (limiting drive force) to reduce the drive force of the auxiliary drive wheel (target value). Specifically, the drive force control means 300 controls the rear differential gear mechanism 61 so that the drive force of the auxiliary drive wheel is reduced by the distribution ratio of the rear differential gear mechanism 61. When the propeller shaft 55 and the rear drive shafts 64, 65 are more weakly connected, the actual auxiliary drive wheel drive force is reduced, and as a result, the actual main drive wheel drive force is increased. Reduced auxiliary drive wheel drive force makes it possible to, e.g., reduce oversteer. Therefore, the stability of the vehicle 1 is improved, for example.

The drive force control means 300 is capable of determining in advance the drive force of the main drive wheel (target value) and the drive force of the auxiliary drive wheel (target value), reducing the drive force of the auxiliary drive wheel (target value) determined in advance in accordance with the request from the vehicle behavior control means 200, and increasing the drive force of the main drive wheel (target value) determined in advance.

The drive force control means 300 may also be referred to as first control means for determining the drive force of the main drive wheel (target value) and the drive force of the auxiliary drive wheel (target value), and the vehicle behavior control means 200 may be referred to as second control means. The drive force control means 300 (first control means) primarily determines the drive force of the main drive wheel (target value) and the drive force of the auxiliary drive wheel (target value). The drive force control means 300 (first control means) may determine whether to respond to the request for limiting the drive force of the auxiliary drive wheel (target value) from the vehicle behavior control means 200 (second control means), and may deny the request for limitation. In the case that the vehicle behavior control means 200 sends to the drive force control means 300 the auxiliary-drive-wheels-limiting drive force (limiting drive force), the drive force control means 300 (first control means) can secondarily (ultimately) determine the drive force of the main drive wheel (target value) and the drive force of the auxiliary drive wheel (target value).

3. Vehicle Behavior Control Means (Second Control Means)

FIG. 2 also shows a schematic structural diagram of the vehicle behavior control means 200 according to the present invention. The vehicle behavior control means 200 (second control means) is capable of requesting the drive force control means 300 (first control means) to limit the drive force of the auxiliary drive wheel (target value). In the example of FIG. 2, the vehicle behavior control means 200 is provided with a detection unit 210, a first calculation unit 220, a second calculation unit 230, an output unit 240, and a third calculation unit 250. The output unit 240 can output to the drive force control means 300 the auxiliary-drive-wheels-limiting drive force.

Figure 3:
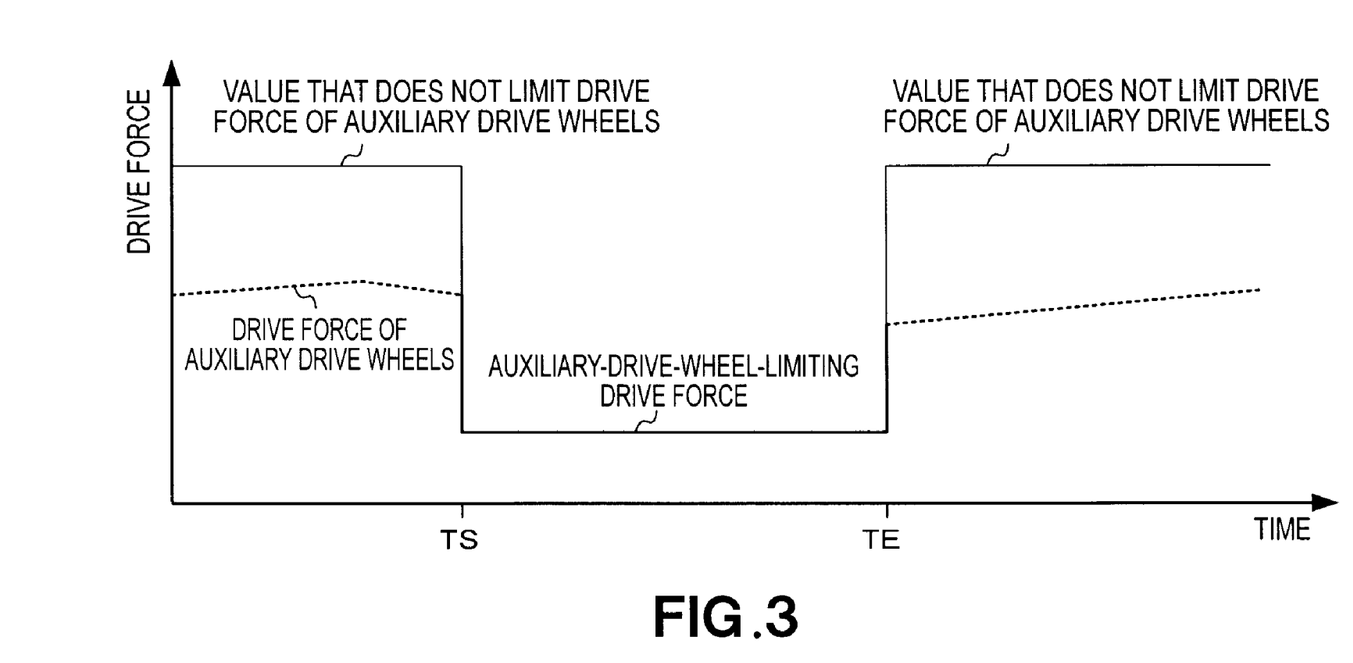
FIG. 3 is a graphical representation of a manner in which a drive force of auxiliary drive wheels is set.

FIG. 3 represents an example relating to setting the drive force of the auxiliary drive wheels. In the example of FIG. 3, the solid line shows the auxiliary-drive-wheel-limiting drive force that is output from the output unit 240. The signal from the detection unit 210 shows that the traveling state of the vehicle 1 is stable until time TS, and the output unit 240 outputs or prepares as the auxiliary-drive-wheel-limiting drive force a value that does not limit the drive force of the auxiliary drive wheel. A value that does not limit the drive force of the auxiliary drive wheel is the maximum value of the drive force of the auxiliary drive wheel that can be determined by, e.g., the drive force control means 300 of FIG. 2. When it is detected by the detection unit 210 at time TE that the traveling state of the vehicle 1 is stable, the output unit 240 outputs or prepares as an auxiliary-drive-wheel-limiting drive force a value that does not limit the drive force of the auxiliary drive wheel. From time TS to time TE, the output unit 240 outputs as the auxiliary-drive-wheel-limiting drive force a value (reference drive force) that limits the drive force of the auxiliary drive wheel. In the example of FIG. 3, the auxiliary-drive-wheel-limiting drive force from time TS to time TE is a fixed value, but is not a fixed value in reality.

In the example of FIG. 3, the dotted line shows the drive force of the auxiliary drive wheel secondarily (ultimately) determined by the drive force control means 300. The solid line from time TS to time TE is drawn in bold and during this interval the drive force control means 300 receives a request from the output unit 240 and causes the drive force of the auxiliary drive wheel to match the auxiliary-drive-wheel-limiting drive force (reference drive force). When the drive force of the auxiliary drive wheels matches the auxiliary-drive-wheel-limiting drive force (reference drive force), the drive force of the auxiliary drive wheels decreases but the drive force of the main drive wheels increases, whereby, e.g., understeer or another unstable traveling state is minimized or eliminated.

3.1 Detection Unit

In the example of FIG. 2, the detection unit 210 detects, e.g., the unstable state of the vehicle 1 and can request the output unit 240 so that the output unit 240 outputs the auxiliary-drive-wheels-limiting drive force. In the case that an unstable state has been detected, the detection unit 210 can send to the output unit 240 a signal (e.g., a signal expressing a binary "1" or high level) expressing request or permission to output the auxiliary-drive-wheel-limiting drive force. For example, the actual yaw rate obtained from the yaw rate sensor 86 and the reference yaw rate calculated based on the speed of the vehicle 1 and the steering angle are used to determine whether or not the vehicle 1 is traveling in a stable state. Specifically, an unstable state can be defined as when the difference between the actual yaw rate and the reference yaw rate (yaw rate deviation) is greater than a predetermined value. Also, an unstable state may be determined by subjecting the yaw rate deviation to filter processing. It is also possible to correct or adjust the reference yaw rate using the lateral acceleration acquired from the lateral acceleration sensor 87.

The detection unit 210 can accept input of the steer angle from, e.g., the steering angle sensor 89. Also, the detection unit 210 is capable of calculating the average of four rotational speeds (wheel speeds) detected by, e.g., the wheel speed sensors 81, 82, 83, 84 and obtain the average wheel speed Vaw_av of the drive wheels as the speed of the vehicle 1. Alternatively, the detection unit 210 calculates the average of two rotational speeds (wheel speeds) detected by, e.g., wheel speed sensors 83, 84 and can obtain or estimate the speed Vvh_es of the vehicle 1.

The speed Vvh_es (estimated speed) of the vehicle 1 may include the application of an increasing limit and a decreasing limit to each of the wheel speeds of the rear wheels 73, 74 (auxiliary drive wheels) in order to eliminate the effect of noise caused by vibrations and the like of the vehicle 1, for example. In other words, the detection unit 210 is capable of correcting or adjusting the two rotational speeds (wheel speeds) detected by the wheel speed sensors 83, 84, calculating the average of the two rotational speeds (wheel speeds) thus corrected or adjusted, and obtaining or estimating the speed Vvh_es of the vehicle 1. The speed Vvh_es (estimated speed) of the vehicle 1 may be estimated using another method.

The detection unit 210 is capable of sending to the output unit 240 a signal that expresses whether the traveling state of the vehicle 1 is unstable, and is furthermore capable of sending to the third calculation unit 250 a signal that expresses the speed, e.g., the estimated speed of the vehicle 1. In the case that the traveling state of the vehicle 1 is unstable, the output unit 240 is capable of outputting to the drive force control means 300 a limiting drive force (auxiliary-drive-wheel-limiting drive force) calculated by the first calculation unit 220 or the second calculation unit 230 (or the third calculation unit 250).

3.2. First Calculation Unit

The first calculation unit 220 of FIG. 2 calculates a first limiting drive force on the basis of the lateral acceleration. The first limiting drive force is set to be greater in proportion to a greater magnitude of the lateral acceleration.

Figure 4:
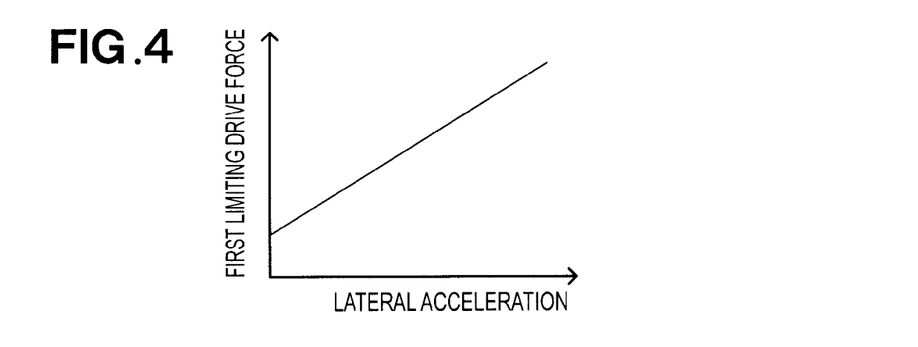
FIG. 4 is a graph showing a control map used for setting a first limiting drive force.

FIG. 4 represents an example relating to setting the first limiting drive force. In the example of FIG. 4, the first limiting drive force is higher in correspondence with a higher speed; however, the relationship between the first limiting drive force and the lateral acceleration is not limited to the example of FIG. 4. For example, the relationship between the first limiting drive force and the lateral acceleration may also be a line chart. The relationship between the first limiting drive force and the lateral acceleration may be a curve expressed by a quadratic function, a higher-degree polynomial function, or the like rather than a linear function; and may be a stepped linear relationship expressed by a step function.

The proportion coefficient in the example of FIG. 4 may be suitably set in accordance with the attributes (e.g., weight, engine displacement) of the vehicle 1.

The first limiting drive force is preferably set to be greater in proportion to a greater magnitude of the lateral acceleration. In the case that the lateral acceleration is high, the first limiting drive force is also high. Therefore, the amount of reduction in the drive force of the auxiliary drive wheels is low in the case that such a first limiting drive force is outputted from the output unit 240. In the case that the lateral acceleration is high, the first limiting drive force is increased and the amount of reduction of the drive force of the auxiliary drive wheels is reduced, whereby the understeer that occurs after oversteer has been eliminated is reduced. The first calculation unit 220 is thus capable of improving the stability of the vehicle 1.

Even if the first limiting drive force (auxiliary-drive-wheel-limiting drive force) does not depend on the lateral acceleration, the first limiting drive force can be set to be constant. In such a comparative example, it is possible that understeer will occur even after oversteer has been eliminated by the constant first limiting drive force in the case that the lateral acceleration is high.

3.3. Second Calculation Unit

The second calculation unit 230 of FIG. 2 calculates a second limiting drive force on the basis of the longitudinal acceleration. The second limiting drive force is set to be greater in proportion to a greater magnitude of the longitudinal acceleration.

Figure 5:
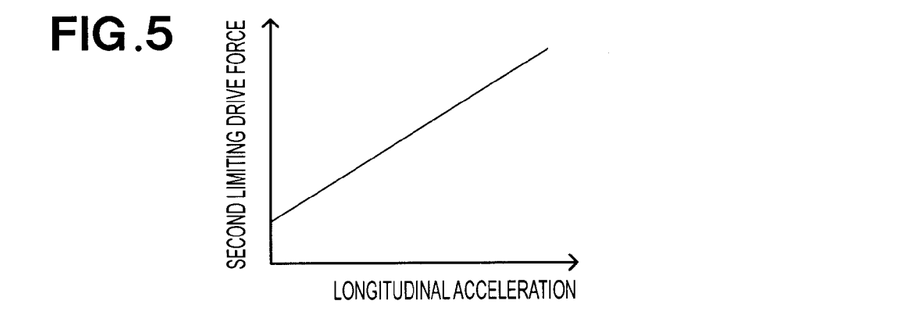
FIG. 5 is a graph showing a control map used for setting a second limiting drive force.

FIG. 5 represents an example relating to the setting of the second limiting drive force. In the example of FIG. 5, the second limiting drive force is higher in correspondence with higher longitudinal acceleration, but the relationship between the second limiting drive force and the longitudinal acceleration is not limited to the example of FIG. 5. For example, the relationship between the second limiting drive force and the longitudinal acceleration may also be a line chart. The relationship between the second limiting drive force and the longitudinal acceleration may be a curve expressed by a quadratic function, a higher-degree polynomial function, or the like rather than a linear function; and may be a stepped linear relationship expressed by a step function.

The proportion coefficient in the example of FIG. 5 may be suitably set in accordance with the attributes of the vehicle 1.

The second limiting drive force is preferably set to be greater in proportion to a greater magnitude of the longitudinal acceleration. In the case that the longitudinal acceleration is high, the second limiting drive force is also high. Therefore, the amount of reduction in the drive force of the auxiliary drive wheels is low in the case that such a second limiting drive force is outputted from the output unit 240. In the case that the longitudinal acceleration is high, the second limiting drive force is increased and the amount of reduction of the drive force of the auxiliary drive wheels is reduced, whereby the understeer that occurs after oversteer has been eliminated can be reduced. The second calculation unit 230 is thus capable of improving the stability of the vehicle 1.

Even if the second limiting drive force (auxiliary-drive-wheel-limiting drive force) does not depend on the longitudinal acceleration, the second limiting drive force can be set to be constant. In such a comparative example, it is possible that understeer will occur even after oversteer has been elimi-nated by the constant second limiting drive force in the case that the longitudinal acceleration is high.

3.4. Output Unit

Specifically, the output unit 240 of FIG. 2 outputs to, e.g., the drive force control means 300 of FIG. 2 a maximum limiting drive force of the first limiting drive force from the first calculation unit 220 and the second limiting drive force from the second calculation unit 230 as the auxiliary-drive-wheel-limiting drive force. In the case that the output unit 240 accepts the third limiting drive force as input from the third calculation unit, the output unit 240 can output the maximum limiting drive force among the first limiting drive force, the second limiting drive force, and the third limiting drive force as the auxiliary-drive-wheel-limiting drive force. In the case that the output unit 240 receives, e.g., a signal (e.g., a signal expressing a binary "1" or high level) expressing request or permission to output the auxiliary-drive-wheel-limiting drive force from the detection unit 210, the output unit 240 can output to the drive force control means 300 an auxiliary-drive-wheel-limiting drive force (maximum limiting drive force). Specifically, the output unit 240 or the vehicle behavior control means 200 outputs to the drive force control means 300 a request to cause the drive force of the auxiliary drive wheels to match the auxiliary-drive-wheel-limiting drive force (maximum limiting drive force). The drive force control means 300 reduces the drive force of the auxiliary drive wheels to the auxiliary-drive-wheel-limiting drive force (maximum limiting drive force), and increases the drive force of the main drive wheels by an amount equal to the reduction amount (a value obtained by subtracting the auxiliary-drive-wheel-limiting drive force from the drive force of the auxiliary drive wheels) of the drive force of the auxiliary drive wheels.

3.5. Third Calculation Unit

The third calculation unit 250 of FIG. 2 calculates a third limiting drive force on the basis of the speed of the vehicle 1; e.g., the estimated speed. The third limiting drive force may be set to be lower in proportion to a higher speed of the vehicle 1. Instability (e.g., oversteer) of the vehicle 1 can generally be effectively suppressed or avoided as the amount of reduction in the drive force of an auxiliary drive wheel is greater, hence, as the auxiliary-drive-wheel-limiting drive force is smaller. Nevertheless, the third limiting drive force can be used as the auxiliary-drive-wheel-limiting drive force (maximum limiting drive force) as long as the third limiting drive force is greater than the first limiting drive force or the second limiting drive force. In other words, the stability of the vehicle 1 can be given priority in the case that the lateral acceleration or the longitudinal acceleration is high. That is to say, in the case that the first limiting drive force or the second limiting drive force is greater than the third limiting drive force, the reduction amount of the drive force of the auxiliary drive wheels can be reduced to give priority to the stability of the vehicle 1 without the use of the third limiting drive force.

The third calculation unit 250 can accept, e.g., the drive force of all wheels (target value) from the drive force control means 300 of FIG. 2 and calculate the third limiting drive force on the basis of the drive force of all the wheels. Specifically, the third calculation unit 250 can calculate as a provisional third limiting drive force a value obtained by multiplying the drive force of all the wheels and the drive force distribution of the auxiliary drive wheels. For example, in the case that the drive force distribution of the auxiliary drive wheels is X %, the third calculation unit 250 can multiply the drive force of all the wheels by X/100 to obtain a provisional third limiting drive force. At this time, the third calculation unit 250 is capable of giving consideration to the speed of the vehicle 1. In other words, the drive force distribution of the auxiliary drive wheels may be set to be lower in proportion to a higher speed of the vehicle 1. In the case that the distribution ratio of the rear differential gear mechanism 61 is, e.g., (100−x):0 in terms of the front-wheel drive force to rear-wheel drive force, the drive force distribution X of the auxiliary drive wheels is set to be less than x (e.g., 50).

Figure 6:
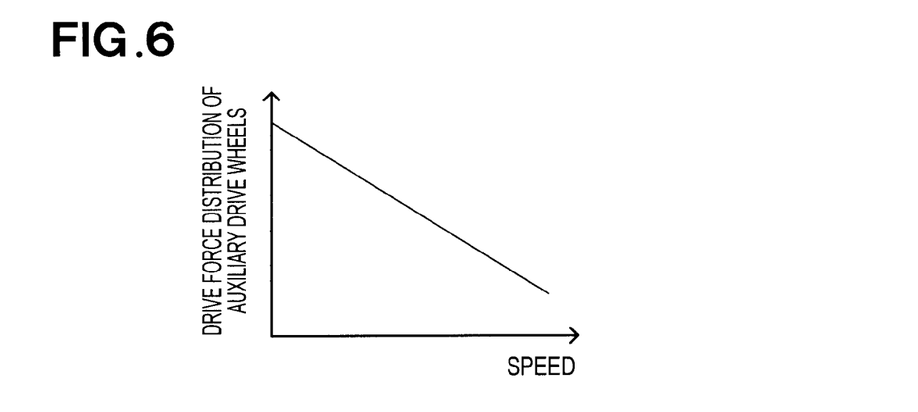
FIG. 6 is a graph showing a control map used for setting a drive force distribution of the auxiliary drive wheels.

FIG. 6 represents an example relating to setting the drive force distribution of the auxiliary drive wheels. In the example of FIG. 5, the drive force distribution of the auxiliary drive wheels is smaller in proportion to a speed of the vehicle 1, but the relationship between the drive force distribution of the auxiliary drive wheels and the speed of the vehicle 1 is not limited to the example of FIG. 6. For example, the relationship between the drive force distribution of the auxiliary drive wheels and the speed of the vehicle 1 may also be a line chart. The relationship between the drive force distribution of the auxiliary drive wheels and the speed of the vehicle 1 may be a curve expressed by a quadratic function, a higher-degree polynomial function, or the like rather than a linear function; and may be a stepped linear relationship expressed by a step function.

The proportion coefficient in the example of FIG. 6 may be suitably set in accordance with the attributes of the vehicle 1.

The drive force distribution of the auxiliary drive wheels is preferably set to be lower in proportion to a higher speed of the vehicle 1. At this time, the third calculation unit 250 can calculate as a third limiting drive force a value obtained by multiplying the drive force of all the wheels and the drive force distribution of the auxiliary drive wheels which depends on the speed of the vehicle 1. The third calculation unit 250 thus preferably calculates the third limiting drive force on the basis of the drive force of all the wheels of the vehicle, the drive force distribution of the auxiliary drive wheels, and the speed of the vehicle 1.

4. Modified Examples

Figure 7:
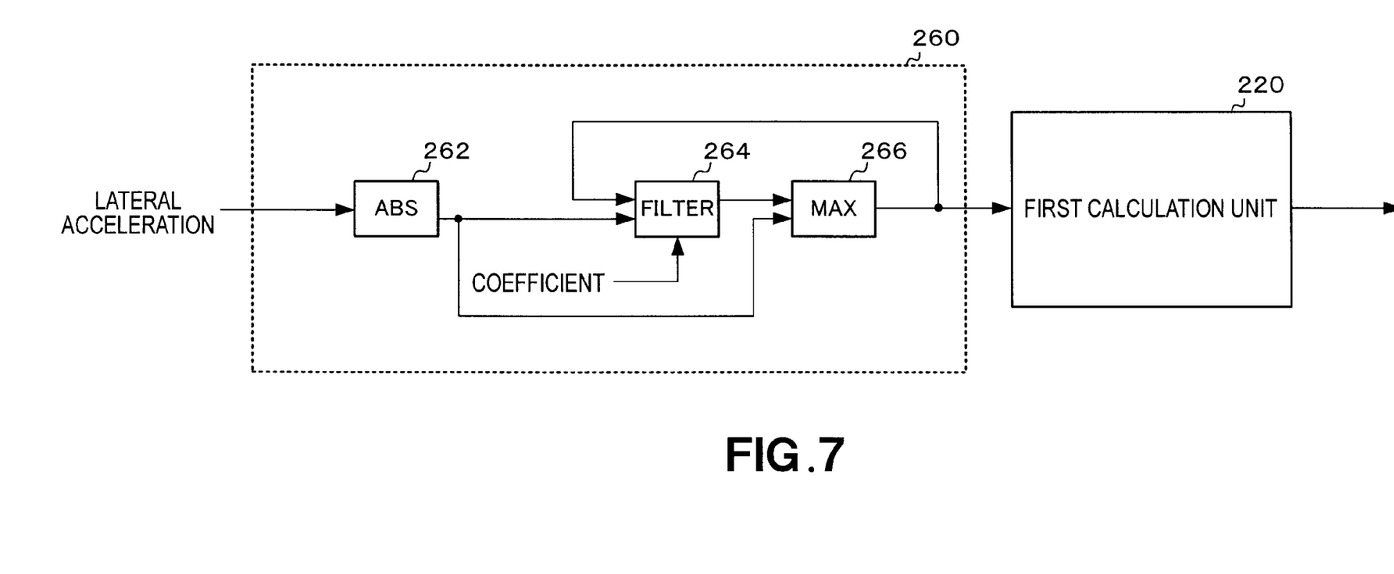
FIG. 7 is a block diagram showing a modified example for inputting a lateral acceleration to a first calculation unit via a first correction unit.

FIG. 7 represents a modified example for inputting the lateral acceleration to the first calculation unit 220 via the first correction unit 260. The first setting unit 260 corrects the lateral acceleration to obtain a corrected lateral acceleration. The first calculation unit 220 calculates a first limiting drive force on the basis of the corrected lateral acceleration. The relationship between the first limiting drive force and the corrected lateral acceleration can be set in the manner of the example of FIG. 4, and the first limiting drive force is preferably set to be higher in proportion to a higher corrected lateral acceleration.

In the example of FIG. 7, the first setting unit 260 has absolute value-obtaining means 262, first filter means 264, and first maximum value-obtaining means 266. The absolute value-obtaining means 262 acquires the absolute value of the lateral acceleration. The first filter means 264 filters the previous output (the previous corrected lateral acceleration) from the first maximum value-obtaining means 266 and the current output (the absolute value of the current uncorrected lateral acceleration) from the absolute value-obtaining means 262. Specifically, the first filter means 264 calculates a value (first mixed value) between the previous corrected lateral acceleration and the absolute value of the current uncorrected lateral acceleration using a first coefficient. The first filter means 266 acquires the maximum value among the previous output (the current first mixed value) from the first filter means 264 and the current output (the absolute value of the current uncorrected lateral acceleration) from the absolute value-obtaining means 262. For example, in the case that the current first mixed value is less that the absolute value of the current uncorrected lateral acceleration, the first maximum value-obtaining means 266 outputs the absolute value of the current uncorrected lateral acceleration as the current corrected lateral acceleration.

Figure 8:
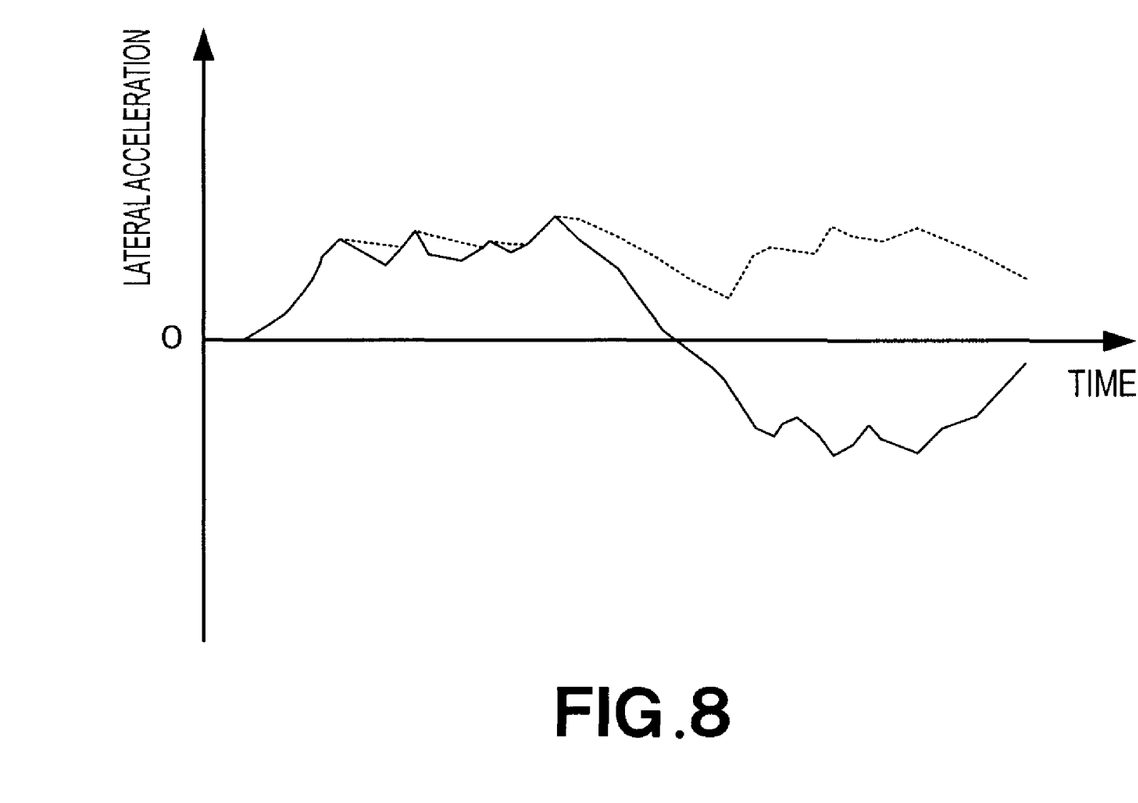
FIG. 8 is a graph showing an example of calculating a corrected lateral acceleration.

FIG. 8 represents an example relating to calculating the corrected lateral acceleration. In the example of FIG. 8, the solid line shows the uncorrected lateral acceleration, and the dotted line shows the corrected lateral acceleration. In the case that the absolute value of the lateral acceleration is reduced, the first correction unit 260 can obtain a corrected lateral acceleration so as to suppress a reduction in the lateral acceleration. Specifically, the first correction unit 260 filters the uncorrected lateral acceleration to obtain a corrected lateral acceleration. The filter process (first filter process) is carried out, for example, in the following manner. In the case that the absolute value of the current uncorrected lateral acceleration is reduced from the absolute value of the previous uncorrected lateral acceleration by an amount equal to, e.g., a first value, the first correction unit 260 calculates a value reduced from the previous corrected lateral acceleration by an amount equal to a second value as the current corrected lateral acceleration. The second value is set to be less than the first value.

Figure 9:
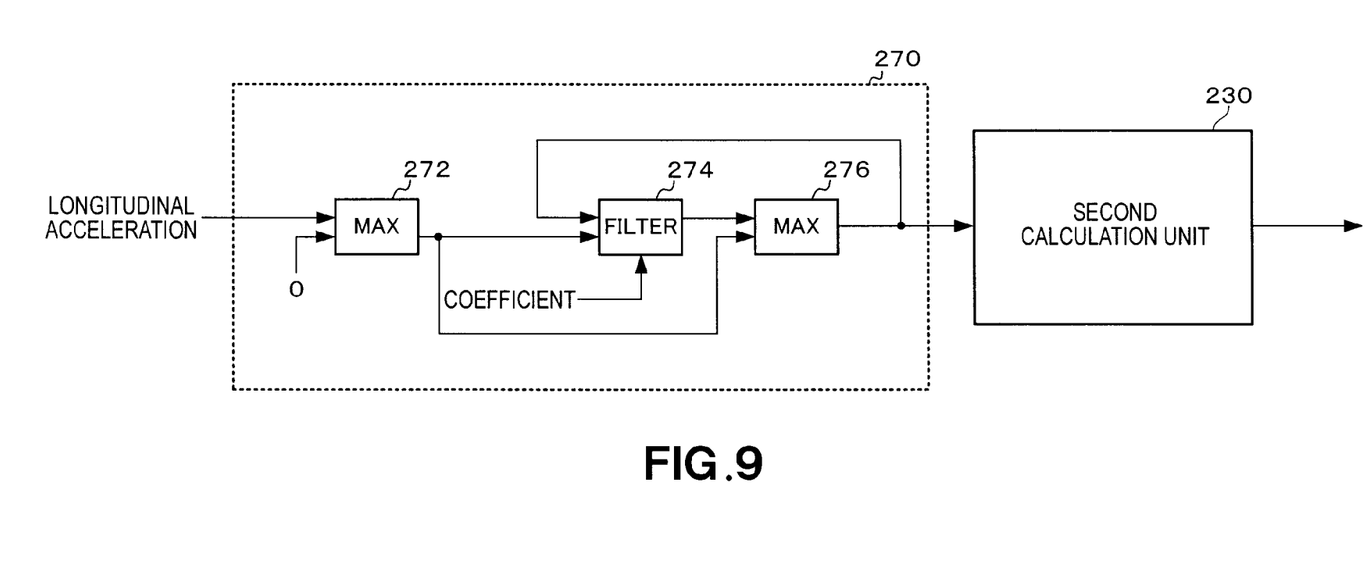
FIG. 9 a block diagram showing a modified example for inputting a longitudinal acceleration to a second calculation unit via a second correction unit.
Figure 10:
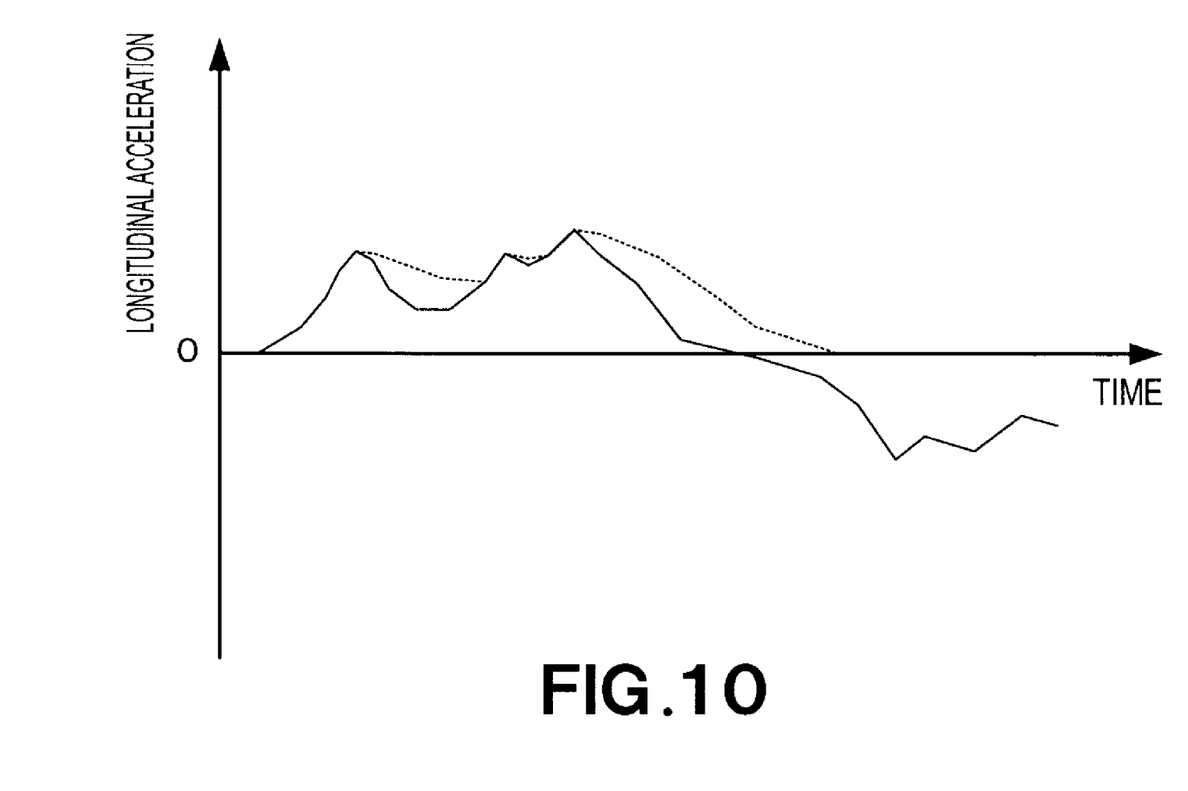
FIG. 10 is a graph showing an example of calculating a corrected longitudinal acceleration.

FIG. 9 represents a modified example for inputting the longitudinal acceleration to the second calculation unit 230 via the second correction unit 270. The second setting unit 270 corrects the longitudinal acceleration to obtain a corrected longitudinal acceleration. The second calculation unit 230 calculates a second limiting drive force on the basis of the corrected longitudinal acceleration. The relationship between the second limiting drive force and the corrected longitudinal acceleration can be set in the manner of the example of FIG. 5, and the second limiting drive force is preferably set to be higher in proportion to a higher corrected longitudinal acceleration.

In the example of FIG. 9, the second setting unit 270 has second maximum value-obtaining means 272, second filter means 274, and third maximum value-obtaining means 276. The second maximum value-obtaining means 272 acquires the maximum value among the longitudinal acceleration and zero. The second filter means 274 filters the previous output (the previous corrected longitudinal acceleration) from the third maximum value-obtaining means 276 and the current output (the maximum value among the current uncorrected longitudinal acceleration and zero) from the second maximum value-obtaining means 272. Specifically, the second filter means 274 calculates, using a second function, a value (second mixed value) between the previous corrected longitudinal acceleration and the maximum value among the current uncorrected longitudinal acceleration and zero. The third maximum value-obtaining means 276 acquires the maximum value among the current output (the current second mixed value) from the second filter means 274 and the current output (the maximum value among the current uncorrected longitudinal acceleration and zero) from the second maximum value-obtaining means 272. For example, in the case that the current second mixed value is less than the maximum value among the current uncorrected longitudinal acceleration and zero, the third maximum value-obtaining means 276 outputs the maximum value among the current uncorrected longitudinal acceleration and zero as the current corrected longitudinal acceleration.

FIG. 9 represents an example relating to calculating the corrected longitudinal acceleration. In the example of FIG. 9, the solid line shows the uncorrected longitudinal acceleration, and the dotted line shows the corrected longitudinal acceleration. In the case that the absolute value of the lateral acceleration is reduced, the first correction unit 270 can obtain a corrected lateral acceleration so as to suppress a reduction in the lateral acceleration. In the case that the maximum value among the longitudinal acceleration and zero is reduced, the second setting unit 270 can obtain the corrected longitudinal acceleration so that a reduction in the maximum value among the longitudinal acceleration and zero is suppressed. Specifically, the second correction unit 270 filters the uncorrected longitudinal acceleration to obtain a corrected longitudinal acceleration. The filter process (second filter process) is carried out, for example, in the following manner. In the case that the absolute value of the current uncorrected lateral acceleration is reduced from the absolute value of the previous uncorrected lateral acceleration by an amount equal to, e.g., a first value, the first correction unit 270 calculates a value reduced from the previous corrected lateral acceleration by an amount equal to a second value as the current corrected lateral acceleration. In the case that the maximum value among the current corrected longitudinal acceleration and zero is reduced from the maximum value among the previous uncorrected longitudinal acceleration and zero by an amount equal to, e.g., a third value, the second setting unit 270 calculates a value reduced from the previous corrected longitudinal acceleration by an amount equal to a fourth value as the current corrected longitudinal acceleration.

Obviously, various minor changes and modifications of the present invention are possible in light of the above teaching. It is therefore to be understood that within the scope of the appended claims the invention may be practiced otherwise than as specifically described.

What is claimed is:

1. A control device for controlling a front-wheel drive force and a rear-wheel drive force of a vehicle, the control device comprising:
   first control means for controlling a drive force of a main drive wheel and a drive force of an auxiliary drive wheel, the drive force of the main drive wheel being one of the front-wheel drive force and the rear-wheel drive force, and the drive force of the auxiliary drive wheel being another of the front-wheel drive force and the rear-wheel drive force; and
   second control means for sending to the first control means an auxiliary-drive-wheel-limiting drive force for limiting the drive force of the auxiliary drive wheel in a case that the vehicle is traveling in an unstable state, wherein
   the second control means has:
   a first calculation unit for calculating a first limiting drive force on the basis of lateral acceleration of the vehicle;
   a second calculation unit for calculating a second limiting drive force on the basis of longitudinal acceleration of the vehicle, and wherein
   the second control means sends to the first control means a maximum limiting drive force among the first limiting drive force and the second limiting drive force as the auxiliary-drive-wheel-limiting drive force.

2. The control device according to claim 1, wherein the first control means increases the drive force of the main drive wheel by causing the drive force of the auxiliary drive wheel to match the auxiliary-drive-wheel-limiting drive force.

3. The control device according to claim 1, wherein the first limiting drive force is greater in proportion to a greater magnitude of the lateral acceleration.

4. The control device according to claim 1, wherein the second limiting drive force is greater in proportion to a greater magnitude of the longitudinal acceleration.

5. The control device according to claim 1, wherein the second control means further has a third calculation unit for calculating a third limiting drive force on the basis of a speed of the vehicle; and
the second control means sends to the first control means a maximum limiting drive force among the first limiting drive force, the second limiting drive force, and the third limiting drive force as the auxiliary-drive-wheel-limiting drive force.

6. The control device according to claim 5, wherein the third limiting drive force is smaller in proportion to a greater magnitude of the vehicle speed.

7. The control device according to claim 5, wherein the third calculation unit calculates the third limiting drive force on the basis of a drive force of all the wheels of the vehicle, a drive force distribution of an auxiliary drive wheel of the vehicle, and the vehicle speed.

8. The control device according to claim 7, wherein the drive force distribution of the auxiliary drive wheel is smaller in proportion to a greater magnitude of the vehicle speed.

9. The control device according to claim 1, wherein the second control means further has a correction unit for correcting the lateral acceleration to obtain a corrected lateral acceleration, wherein
the first calculation unit calculates the first limiting drive force on the basis of the corrected lateral acceleration; and
in a case that an absolute value of a current lateral acceleration is reduced from an absolute value of a previous lateral acceleration by an amount equal to a first value, the correction unit calculates a value reduced from a previous corrected lateral acceleration by an amount equal to a second value as a current corrected lateral acceleration, the second value being less than the first value.

10. The control device according to claim 1, wherein the second control means further has a correction unit for correcting the longitudinal acceleration to obtain a corrected longitudinal acceleration,
the second calculation unit calculates a second limiting drive force on the basis of the corrected longitudinal acceleration; and
in a case that a maximum value of the current longitudinal acceleration and zero is reduced from a maximum value of a previous longitudinal acceleration and zero by an amount equal to a first value, the correction unit calculates a value reduced from a previous corrected longitudinal acceleration by an amount equal to a second value as a current corrected longitudinal acceleration, the second value being less than the first value.

11. The control device according to claim 1, wherein the drive force of the main drive wheel is the front-wheel drive force, and
the drive force of the auxiliary drive wheel is the rear-wheel drive force.

12. The control device according to claim 1, wherein the first control means is a drive force control means, and the second control means is a vehicle behavior control means.

* * * * *